US007305668B2

(12) United States Patent
Kennedy et al.

(10) Patent No.: US 7,305,668 B2
(45) Date of Patent: Dec. 4, 2007

(54) SECURE METHOD TO PERFORM COMPUTER SYSTEM FIRMWARE UPDATES

(75) Inventors: Barry Kennedy, Hillsboro, OR (US); Mahesh S. Natu, Portland, OR (US); John V. Lovelace, Irmo, SC (US); Andrew Fish, Olympia, WA (US); Sharif S. Faraq, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 854 days.

(21) Appl. No.: 10/210,472

(22) Filed: Jul. 31, 2002

(65) Prior Publication Data

US 2004/0024917 A1 Feb. 5, 2004

(51) Int. Cl.
*G06F 9/44* (2006.01)
*G06F 1/24* (2006.01)
*G06F 12/00* (2006.01)

(52) U.S. Cl. ...................... 717/168; 717/173; 713/100; 713/2; 711/103

(58) Field of Classification Search .................... 713/2, 713/183, 187, 175, 1; 717/168–178, 162, 717/170, 171
See application file for complete search history.

(56) References Cited

U.S. PATENT DOCUMENTS

| | | | | |
|---|---|---|---|---|
| 5,371,876 | A | 12/1994 | Ewertz et al. | |
| 5,535,355 | A * | 7/1996 | Scales | 711/101 |
| 5,579,522 | A * | 11/1996 | Christeson et al. | 713/2 |
| 5,790,670 | A * | 8/1998 | Bramlett | 380/52 |
| 5,826,075 | A * | 10/1998 | Bealkowski et al. | 713/187 |
| 5,878,256 | A * | 3/1999 | Bealkowski et al. | 713/2 |
| 5,968,141 | A * | 10/1999 | Tsai | 710/14 |
| 6,571,335 | B1 * | 5/2003 | O'Donnell et al. | 713/173 |
| 6,622,246 | B1 * | 9/2003 | Biondi | 713/100 |
| 2004/0054907 | A1 * | 3/2004 | Chateau et al. | 713/175 |

OTHER PUBLICATIONS

U.S. Appl. No. 09/468,202, filed Dec. 20, 1999, titled "Method and Apparatus for Securing Computer Firmware," 29 pages.

* cited by examiner

*Primary Examiner*—Tuan Dam
*Assistant Examiner*—Isaac Tecklu
(74) *Attorney, Agent, or Firm*—Racheol Wu

(57) ABSTRACT

A secure method for updating computer firmware online is described. The firmware storage locations are write protected prior to loading the operating system. Updating the firmware after loading the operating system helps to reduce downtime.

35 Claims, 5 Drawing Sheets

CPU
210
Bus 215
Main Memory
240
Bus 235
Chipset
230
GPIO Bit
260
Bus 265
270
Storage Area
272
Storage Area
274

SECURE METHOD TO PERFORM COMPUTER SYSTEM FIRMWARE UPDATES

FIELD OF THE INVENTION

The present invention pertains to the field of updating computer system firmware in a secure environment. More particularly, the present invention relates to an efficient method of performing secure firmware updates in a computer system while an operating system is running.

BACKGROUND OF THE INVENTION

In a computer system, an operating system (OS) performs functions such as scheduling application programs and resolving conflicts among applications that request access to the same resources. Moreover, operating systems communicate service requests from application programs to the hardware device drivers. Operating system examples include WINDOWS 95, WINDOWS 98, WINDOWS 2000, WINDOWS NT, and LINUX.

Firmware is a set of hardware setup programs. Firmware is typically stored in flash memory or read only memory. Firmware includes programs that are somewhat analogous to device drivers, which are used to activate the hardware of a standard computer system. A computer may include hardware for performing operations such as reading keystrokes from a keyboard, transmitting information to a video display, or sending information to a printer.

FIG. 1 depicts a flowchart of a firmware update process. The process begins in operation 100 with a firmware update request. Once the process is initiated, the OS is shut down in operation 110. The system is then rebooted in operation 120. Following reboot, a Basic Input/Output System (BIOS) Power On Self-Test (POST) diagnostic that performs hardware tests is executed in operation 130. After DOS or an equivalent OS is booted in operation 135, the firmware update utility is then executed in operation 140 in order to update the firmware. The system is then rebooted again in operation 150. The POST code is run again in operation 160. Finally, the operation system and computer system applications are loaded in operation 170.

Because updating firmware requires that the system be shutdown and rebooted, the process can take as long as 10 minutes. The firmware update process takes even longer for multiple systems connected to a network since each system is serially updated. In addition, because the memory used to store firmware is typically not write protected, firmware is susceptible to tampering.

Other systems update the firmware after the operating system is running. These systems typically utilize System Management Interrupts (SMI) while the OS is running. SMI works fine under desktop operating systems such as WINDOWS 95 and WINDOWS 98, but causes instability under multiprocessor operating systems like WINDOWS 2000 and WINDOWS NT. Moreover, SMI is incompatible with Intel® ITANIUM processor family platforms. Thus, a secure method to perform computer system updates on Intel® ITANIUM processor family platforms and desktop and multiprocessor operating systems would be desirable.

BRIEF DESCRIPTION OF THE DRAWINGS

The embodiments of the present invention are illustrated by way of example and not in the figures of the accompanying drawings, in which like references indicate similar elements and in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The BIOS program is a set of routines used by a computer system to enable communication between a computer processor and input/output devices. BIOS is updated to correct program errors or to add new features such as support for new industry standards or customer specific features. For one embodiment of the invention, the BIOS program is updated under the presence of an OS such as WINDOWS 95, WINDOWS 98, WINDOWS 2000, or WINDOWS NT. In other words, a new BIOS is loaded after the OS is booted. SMI is not used in the firmware update process to avoid instability in multiprocessor operating systems and in Intel® ITANIUM processor family platforms.

Figure 1:
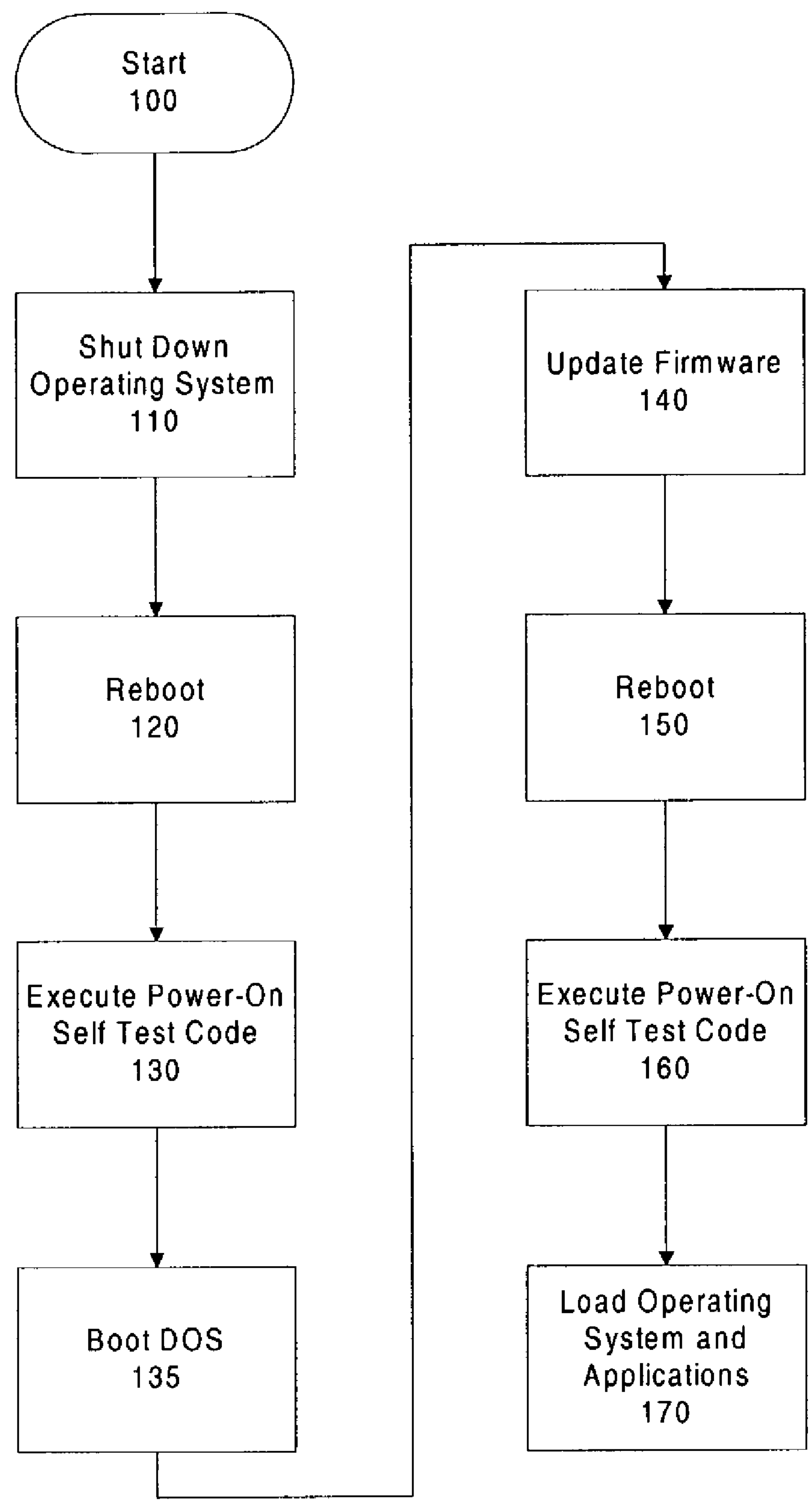
FIG. 1 shows a flowchart of a prior art firmware update process.
Figure 2:
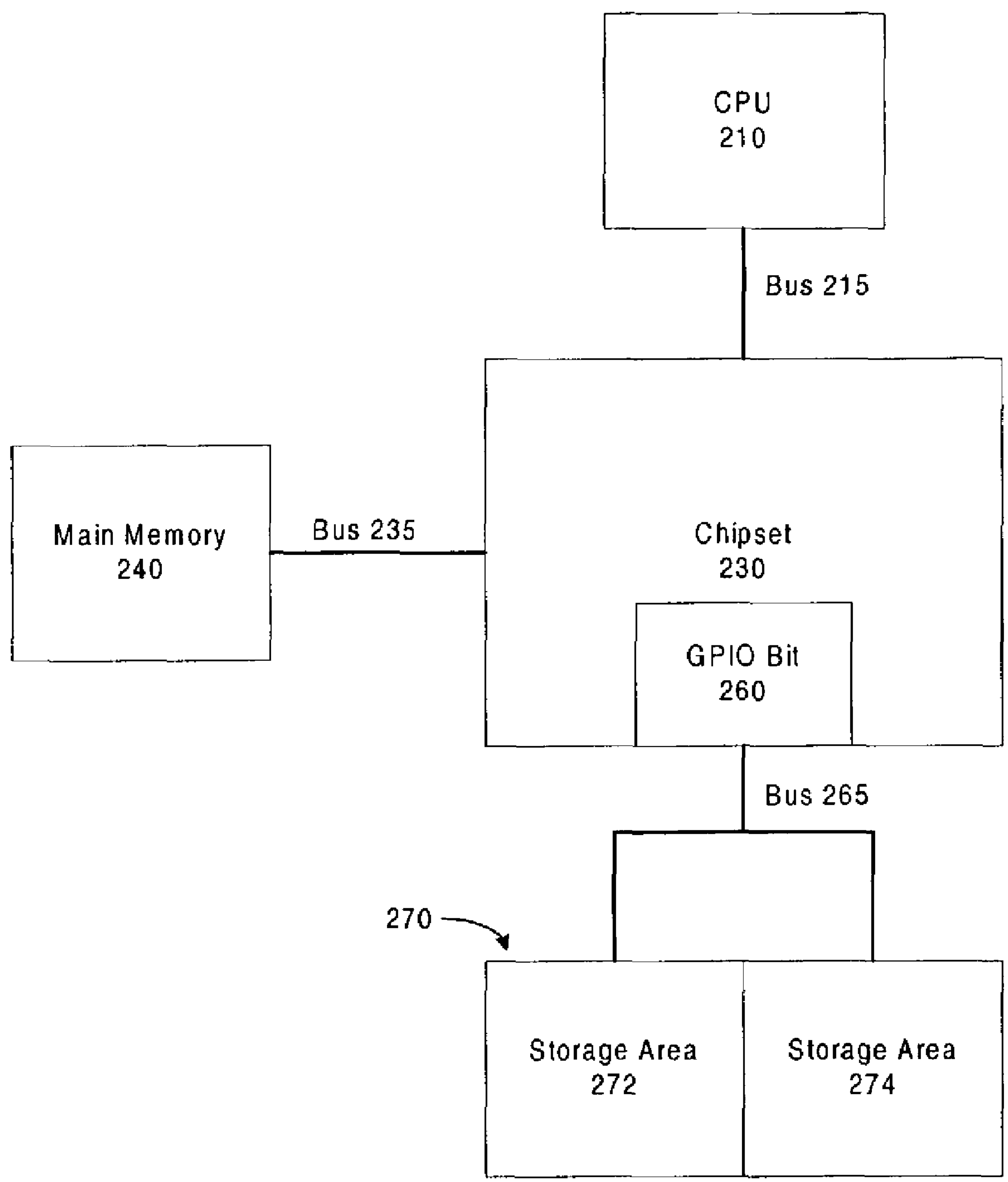
FIG. 2 shows a bock diagram for one embodiment of the invention of a computer system that performs secure firmware updates.

FIG. 2 depicts an example of a computer system to perform secure BIOS updates. The computer system of FIG. 2 can also be used to perform other firmware updates as well. For this embodiment of the invention, central processing unit, CPU 210, is coupled to a chipset 230 through bus 215. The computer system, however, is not limited to having one central processing unit. The computer system may have a plurality of central processing units coupled to the chipset 230. The chipset 230 allows computer components to communicate with the central processing unit(s). Commercially available chipsets include Intel® 815E, Intel® 820E, and Intel® 850. The components of FIG. 2 are coupled to the chipset 230 through bus 235 and bus 265 respectively. Responsibilities of chipset 230 may include efficient data transfers, bus support, and advanced power management features.

For one embodiment of the invention, the firmware storage area 270 is flash memory. Flash memory is usually organized as multiple physical blocks. For this embodiment of the invention, the flash memory is at least twice the size of the system BIOS image. The firmware storage area 270 may be divided into two areas, memory storage area 272 and memory storage area 274. Each of the memory storage areas 272 and 274 may contain multiple physical blocks. The memory storage areas 272 and 274 are also termed active storage area and staged storage area, depending on whether memory storage area 272 or memory storage area 274 is selected by the chipset 230 for its source of BIOS. The selected memory storage area is the active storage area, while the non-selected storage area is the staged storage area.

The firmware stored in the active storage area is executed upon system startup or reset. In contrast, the firmware in the staged storage area is not executed upon system startup or reset. The staged storage area is instead used to store any firmware updates. Firmware updates to the staged storage area may be performed by an OS driver under OS presence. For one embodiment of the invention, the entire BIOS program is updated to correct software code errors. For another embodiment of the invention, the entire BIOS program is updated to add new system features. For yet another embodiment of the invention, a portion of the BIOS program is updated.

Each block of the firmware storage area 270 may be locked down and write protected. Once a block is locked down and write protected, write protection cannot be removed under software control. Thus, after lock down, there is no mechanism that allows update or erase operations to be performed on the firmware storage area 270. The blocks in memory storage area 272 and memory storage area 274 are capable of being independently configured for lock down. During normal system operation, the active storage area is locked down. The staged storage area, however, may also be locked down after firmware updates are performed.

Lock down is only removed by a special control signal applied to the firmware storage area 270. This control signal may be connected to a system-wide control signal. The system-wide control signal forces the processor to execute code from the active storage area. Processor reset or initialization signals are examples of the system-wide control signal. As a result, the lock down remains in effect until the control signal is applied.

The mechanism for selecting the active storage area may be a general purpose input/output (GPIO) signal. The chipset 230 may transmit the signal to select the active storage area to the firmware storage area 270 through the GPIO signal. For one embodiment of the invention, the GPIO signal is transmitted from the chipset 230 through a nonvolatile bit 260. Thus, in the event of a complete power failure to the computer system, the state of the GPIO bit 260 is restored to its pre-power fail condition once the power is restored. It is also important for security purposes that the mechanism for generating the GPIO signal is capable of being locked down or write protected. Otherwise, BIOS is susceptible to tampering. Once the mechanism is write protected, it remains so until a system initialization or reset signal is asserted.

For another embodiment of the invention, the GPIO bit 260 may be implemented in a Super Input/Output (SIO) device. The SIO contains embedded functions and provides a means of communication to other devices through the chipset 230.

For yet another embodiment, the hardware mechanism for selecting the active storage area may be generated by more than one component of the system. Any component that is to be used for selecting the active storage area may be secured through lock down or write protection. For instance, the chipset 230 is described above as having the ability to lock down the mechanism for generating the GPIO signal.

An Intelligent Platform Management Interface (IPMI) compliant baseboard management controller (BMC) is one example of an alternative component to select the active storage area. The BMC is an embedded micro-controller that provides an external communications mechanism for the system. For instance, the BMC may act as an interface to a local area network, a wireless system, or a telephone system. The BMC code is capable of being locked down.

Figure 3:
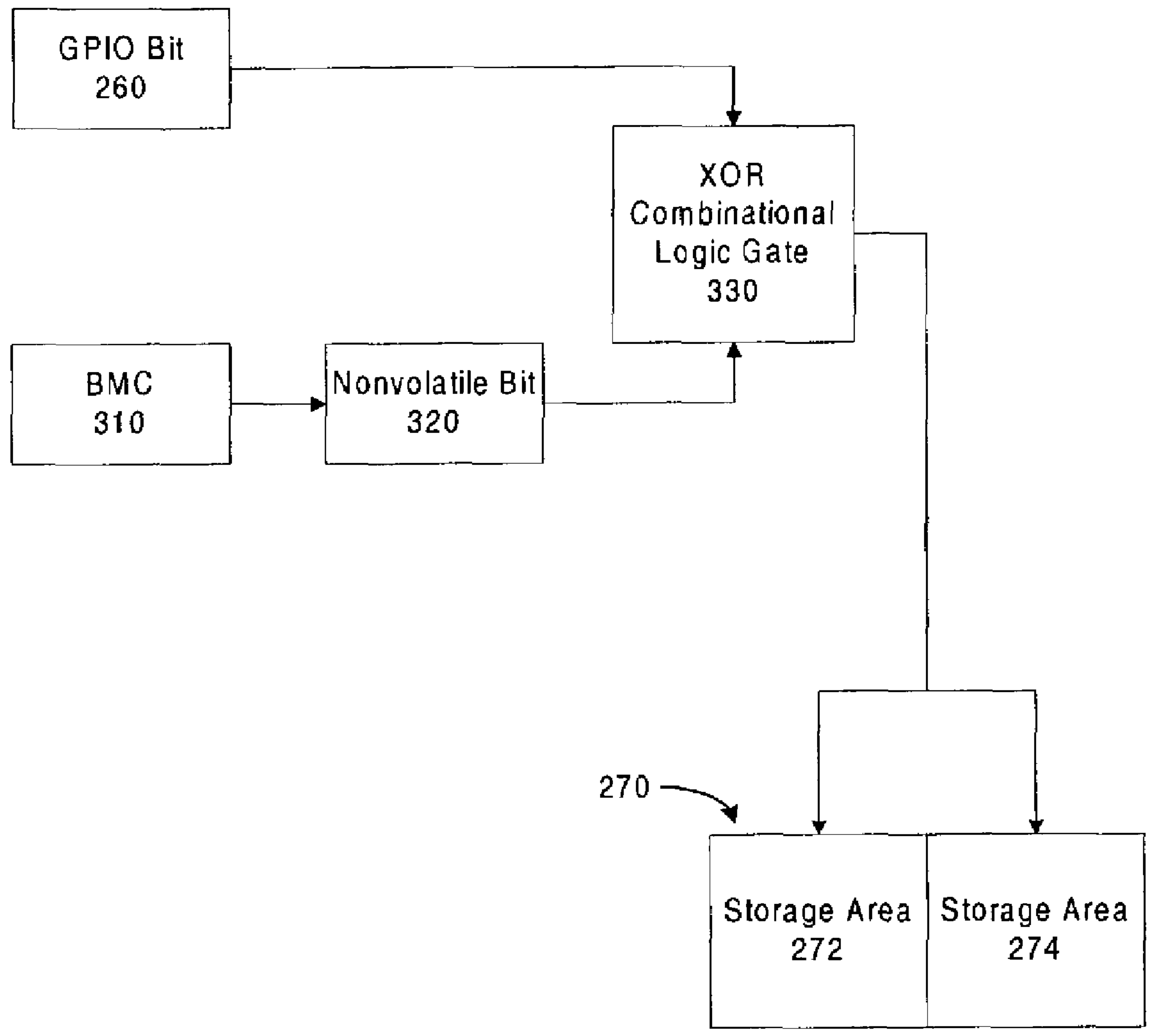
FIG. 3 shows a block diagram for one embodiment of the invention of a circuit for allowing more than one component to select the active storage area.

For yet another embodiment of the invention, both the GPIO bit and the BMC may be used to select the active storage area of the firmware storage area 270. FIG. 3 depicts an example of a circuit that allows multiple components to select the active storage area. In this example, the GPIO bit 260 is coupled to an input of a XOR combinational logic gate 330. A nonvolatile bit 320 is coupled to another input of the XOR gate 330. The signal of the nonvolatile bit is supplied by a BMC 310. The output signal of the XOR gate 330 then selects the active storage area of the firmware storage area 270.

As an example, memory storage area 272 may be selected as the active storage area if the output signal of the XOR gate 330 is asserted high. By default, the memory storage area 274 is the staged storage area. Conversely, memory storage area 274 is selected as the active storage area and memory storage area 272 the staged storage area if the output signal of the XOR gate 330 is asserted low. Therefore, the active storage area will be altered only if one of the input signals from the GPIO bit 260 or nonvolatile bit 320 is different from its previous state.

Figure 4:
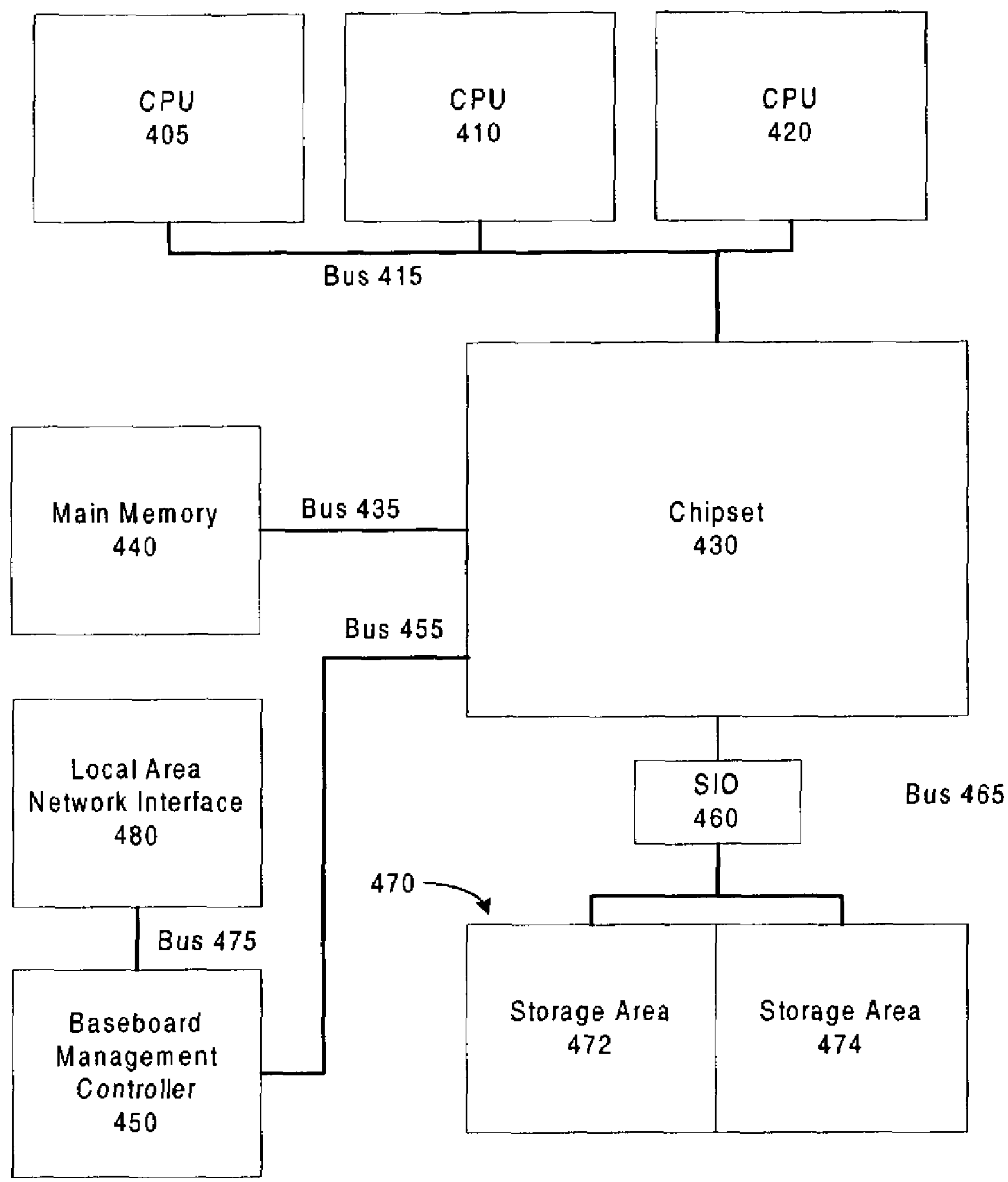
FIG. 4 shows a block diagram for one embodiment of the invention of a computer system connected to a local area network that performs secure firmware updates.

FIG. 4 depicts an embodiment of the invention of a computer system connected to a local area network that performs secure firmware updates. The computer system may have three central processing units: CPU 405, CPU 410, and CPU 420. The central processing units are coupled to the chipset 430 through the bus 415. The chipset 430 may also be coupled to components such as main memory 440, BMC 450, and firmware storage area 470 through bus 435, bus 455, and bus 465 respectively. The firmware storage area 470 comprises an active storage area 472 and a staged storage area 474. The BMC 450 is also coupled to a local area network interface 480.

For a system connected to a local area network, the BMC 450 may be sent new firmware images through the system local area network interface 480. For one embodiment of the invention, the local area network interface 480 receives new firmware images as total cost of ownership (TCO) packets. The BMC 450 takes the TCO packets and strips out the firmware address and data information. The BMC 450 then writes the BIOS image to the firmware storage area 470 through the chipset 430 through a SIO 460. For another embodiment of the invention, the BMC 450 communicates directly with the firmware storage area 470 without having to access the chipset 430. For yet another embodiment of the invention, a driver running under the OS updates the firmware storage area 470 directly without using the BMC 450.

Using the BMC 450 to perform firmware updates provides flexibility because it removes the need for an operating system specific firmware storage area driver to be run. Therefore, new firmware may be loaded to the firmware storage area 470 without the intervention of an operating system. In addition, distributing firmware updates using the BMC 450 and TCO packets over a local area network allows many systems to be updated simultaneously. For example, a data center having hundreds of identical systems may update all of its systems using a batch process.

Figure 5:
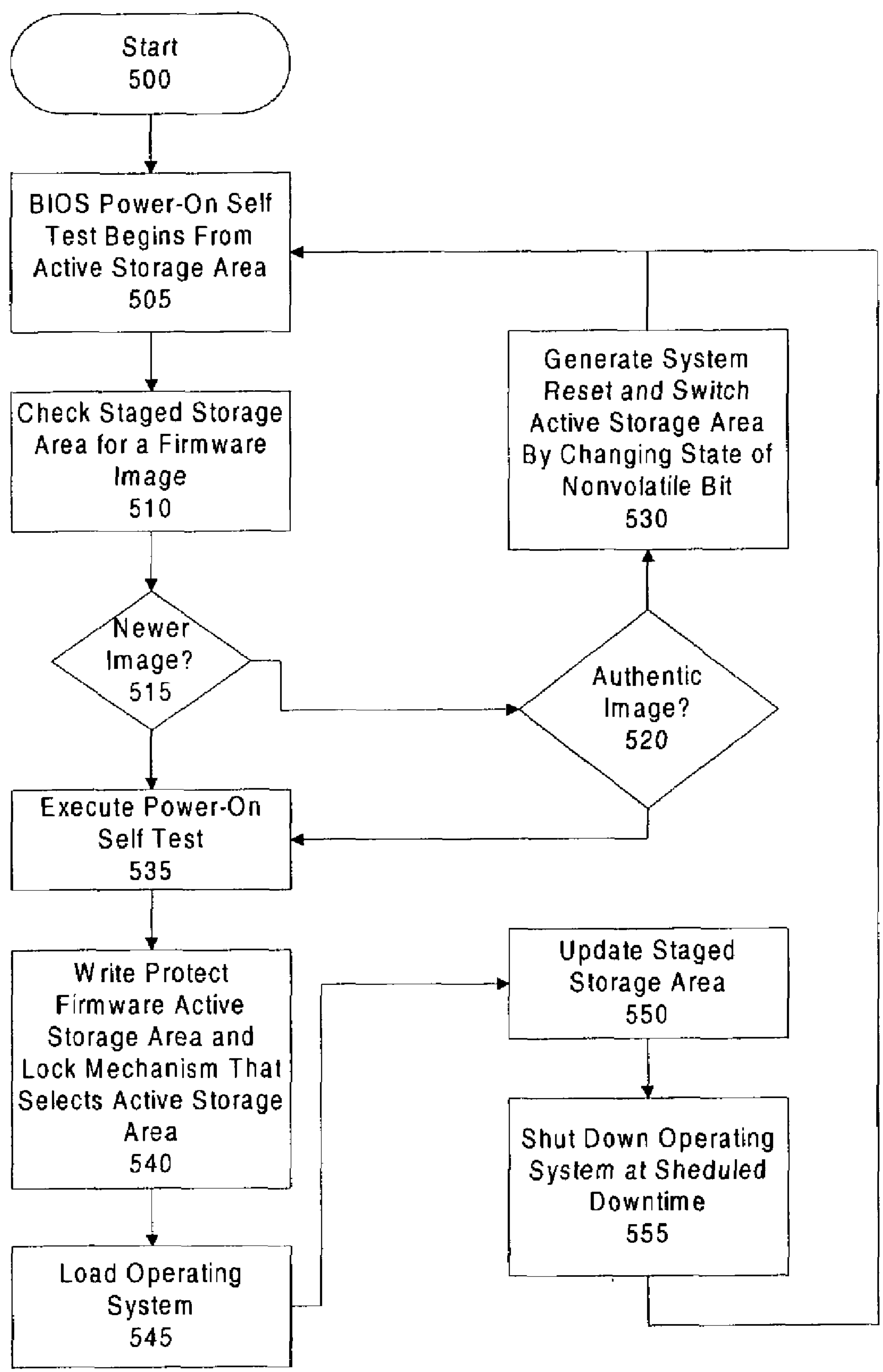
FIG. 5 shows a flowchart for one embodiment of the invention of a firmware update process under an operating system presence.

FIG. 5 depicts an example of a flowchart of the process for checking for new image and controlling BIOS in a computer system. The flowchart of FIG. 5, however, is not limited to updating BIOS and may be used for updating other firmwares of a computer system. The user initiates the process of operation 500 to update BIOS by resetting the system. The BIOS Power On Self-Test is then begun from the firmware active storage area in operation 505. In operation 510, the firmware staged storage area is checked for a BIOS image. If an image is found in the staged storage area, operation 515 then checks whether the image in the staged storage area is newer than the code in the active storage area. Operation 515 may be performed by comparing the time and date stamp of the program codes stored in the active storage area and the staged storage area.

If a newer image is detected, the image in the staged storage area is authenticated in operation 520. Authentication is performed by comparing the firmware program stored in the active area with authentication information stored or loaded to the system. For one embodiment of the invention, the authentication information is saved to the staged storage area. The level of scrutiny in an authentication check is flexible and may range from a simple check sum to a detailed digital signature comparison. If the image in the staged storage area is determined to be authentic, then the active storage area is switched with the staged storage area and a system reset is generated in operation 530.

As an example, the memory storage area 272 may be the active storage area. Thus, after a system reset, the firmware is read from memory storage area 272 in operation 505. The staged storage area is checked in operation 510. If a newer image is detected in operation 515 and the firmware stored in the staged storage area, memory storage area 272, is authenticated in operation 520, the active storage area is switched. Switching the active storage area in this case involves selecting memory storage area 274 as the active storage area and making memory storage area 272 the staged storage area. A system reset is generated in operation 530 before BIOS, including the POST program, is accessed from the new active storage area.

However, the operation 530 of switching the staged storage area with the active storage area is not performed unless both a newer image and an authentic image were detected in the staged storage area in operations 515 and 520 respectively. If a newer image or an authentic image is not detected, the POST program is executed from the current active storage area in operation 535. In other words, the staged storage area and the active storage area are left untouched and the POST program is executed with the code found in the active storage area.

Next, in operation 540, the firmware active storage area is secured by making it write protected. For example, the system BIOS may write protect and lock down the blocks containing active BIOS. The mechanism for allowing write and read operations to select the active storage area is also secured before any unknown software can be loaded. The mechanism is secured when the mechanism is prevented from changing states. At this time, the operating system may be loaded in operation 545. Loading the operating system 545 or any other software code is the process of accessing the code from memory and then executing the code. After the OS is loaded, the staged storage area is updated with the new BIOS code in operation 550. Thus, the BIOS code is updated under OS presence.

Authentication information may be stored in the staged storage area at the same time that the new BIOS code is saved. The new BIOS code is then executed only after the OS is shutdown in operation 555 and the system is rebooted. The OS shutdown may be prompted by the user or may be a scheduled maintenance task.

Postponing the BIOS update until a scheduled OS downtime allows the BIOS update to be performed at an opportune time for the user rather than forcing a shutdown and reboot as soon as a BIOS update is made. As previously stated, shutdown and reboot typically creates potentially significant delays. In addition, by write protecting the active storage area and locking down the hardware mechanism that selects the active storage area, the BIOS update process is performed under a secure environment.

For another embodiment of the invention, the operation 520 of authenticating the image is not performed. Instead, if a newer image is detected in operation 515, the active storage area is immediately switched in operation 530. If a newer image is not detected, the POST code is executed in operation 535.

For yet another embodiment of the invention, the operation 515 of checking for a newer image is not performed. The system authenticates the image stored in the staged storage area in operation 520 if a firmware image is detected in the staged storage area in operation 510. If an authentic image is detected in operation 520, the active storage area is switched in operation 530. The switching process selects the former active storage area as the new staged storage area and conversely, the former staged storage area becomes the new active storage area. If an authentic image is not detected, the active storage area and the staged storage area remain unchanged. The previous image stored in the staged storage area is then erased.

For yet another embodiment of the invention, a "watchdog timer" is coupled to the firmware storage area 270 and may initiate the switching of the active storage area. The watchdog timer monitors the execution of firmware code. If the execution of firmware code takes longer than a predetermined period of time, the watchdog timer times out and switches the active storage area. The watchdog timer then initiates a system reset. After reset, the firmware is read from the new active storage area.

Embodiments of the present invention may be implemented in hardware or software, or a combination of both. However, preferably, embodiments of the invention may be implemented in computer programs executing on programmable computer systems each comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion.

Each program may be implemented in a high level procedural or object oriented programming language to communicate with the computer system. However, the programs may be implemented in assembly or machine language, if desired. In any case, the language may be a compiled or interpreted language.

Each such computer program may be stored on a storage media or device (e.g., hard disk drive, floppy disk drive, read only memory (ROM), CD-ROM device, flash memory device, digital versatile disk (DVD), or other storage device) readable by a general or special purpose programmable computer system, for configuring and operating the computer system when the storage media or device is read by the computer system to perform the procedures described herein. Embodiments of the invention may also be considered to be implemented as a machine-readable storage medium, configured for use with a computer system, where the storage medium so configured causes the computer system to operate in a specific and predefined manner to perform the functions described herein.

In the foregoing specification the invention has been described with reference to specific exemplary embodiments thereof. It will, however, be evident that various modification and changes may be made thereto without departure from the broader spirit and scope of the invention as set forth in the appended claims. The specification and drawings are, accordingly, to be regarded in an illustrative rather than restrictive sense.

What is claimed is:

1. A computer system comprising:

a firmware memory having an active storage area and a staged storage area;

a nonvolatile bit to select the active storage area; and code in the active storage area to authenticate a new image in the staged storage area by comparing a firmware stored in the active storage area with authentication information stored in the staged storage area and switching the staged storage area with the active storage area if both new image and an authentic image are detected.

2. The computer system of claim 1, wherein the nonvolatile bit selects the staged storage area if the new image in the staged storage area is authenticated, wherein the staged storage area becomes the new active storage area and the active storage area becomes the new staged storage area.

3. The computer system of claim 1, wherein the active storage area stores a Basic Input/Output System image.

4. The computer system of claim 1, further comprising:

a chipset, wherein the chipset generates a general purpose input/output signal to select the active storage area.

5. The computer system of claim 1, further comprising:

a baseboard management controller, wherein the baseboard management controller controls the nonvolatile bit.

6. The computer system of claim 1, wherein the new image in the staged storage area is updated under an operating system presence by an operating system level driver.

7. A computer system comprising:

a processor;

a chipset, wherein the chipset is coupled to the processor;

a firmware storage area, wherein the firmware storage area is coupled to the chipset, wherein the firmware storage area comprises an active storage area and a staged storage area, wherein the firmware storage area is capable of being write protected;

a hardware mechanism for selecting the active firmware storage area, wherein the hardware mechanism is locked down before loading software to the staged area; and wherein the active storage area and staged storage area are being independently configured for lock down and wherein the lock down is only removed by a special control signal applied to the storage area.

8. The computer system of claim 7, wherein the hardware mechanism is a baseboard management controller.

9. The computer system of claim 7, wherein the hardware mechanism generates a general purpose input/output signal.

10. The computer system of claim 9, wherein the general purpose input/output signal is communicated through a nonvolatile bit.

11. The computer system of claim 7, wherein the hardware mechanism is a watchdog timer, wherein the watchdog timer switches the active storage area if a predetermined period of time is exceeded in executing a firmware code.

12. The computer system of claim 7, further comprising a local area network interface, wherein the local area network interface is coupled to the baseboard management controller, wherein the local area network interface communicates an updated firmware image.

13. The computer system of claim 12, wherein the updated firmware image is received as a plurality of total cost of ownership packets.

14. The computer system of claim 13, wherein the baseband management controller determines the firmware address and data information from the plurality of total cost of ownership packets.

15. The computer system of claim 14, wherein the baseband management controller transmits data to the firmware storage area.

16. The computer system of claim 7, further comprising:

a plurality of processors.

17. A method for a digital computer to perform secure firmware updates, comprising:

write protecting an active firmware storage area;

locking down a hardware mechanism that selects the active firmware storage area;

loading an operating system; and updating a staged firmware storage area after locking down the hardware mechanism;

wherein the active storage area and staged storage area are being independently configured for lock down, and wherein the lock down is only removed by a special control signal applied to the storage area.

authenticating a new image in the staged storage area using a code in the active storage area; wherein the active storage area and staged storage area are being independently configured for lock down and wherein the lock down is only removed by a special control signal.

18. The method of claim 17, further comprising executing updated firmware after a scheduled downtime.

19. The method of claim 17, wherein the firmware storage area is flash memory.

20. The method of claim 17, wherein the firmware updated is a Basic Input/Output System code.

21. A method of updating firmware to a network of computer systems, comprising:

distributing a firmware update packet over a local area network;

selecting an active storage area of a firmware memory by using a non-volatile bit;

receiving the firmware update packet at a plurality of computer systems in the network of computer systems;

storing the firmware update packet in a staged storage area of a firmware memory at each computer system of the network of computer; and comparing the firmware update packet in the staged storage area with information stored in the active storage area;

if the firmware update packet in the staged storage area is determined to be authentic then a system reset is generated and the active storage area is switched with the staged storage area by changing a state of the non-volatile bit.

22. The method of claim 21, further comprising shutting down the operating system of a computer system of the network of computer systems, wherein the shut down operation is initiated by a user.

23. The method of claim 21, further comprising shutting down the network of computer systems, wherein the shut down operations are a scheduled task.

24. An article comprising a machine readable medium having a plurality of machine readable instructions, wherein when the instructions are executed by a processor, the instructions cause a system to:

access a Basic Input/Output System (BIOS) image from an active storage area at system power up:

write protect the active storage area after the Basic Input/Output System image has been executed:

load an operating system;

update a staged storage area with a BIOS image;

wherein the active storage area and staged storage area are being independently configured for lock down, and wherein the lock down is only removed by a special control signal applied to the storage area.

25. The article of claim 24, wherein the instructions further cause a system to:

lock down a mechanism for selecting the active storage area prior to loading the operating system.

26. The article of claim 25, wherein lock down is removed by a processor reset signal.

27. The article of claim 25, wherein lock down is removed by a processor initialization signal.

28. The article of claim 24, wherein the instructions further cause a system to:

shut down the operating system during a scheduled downtime; and access the updated Basic Input/Output System image after the scheduled downtime.

29. An apparatus comprising:

means for storing software to an active area and a staged area;

means for write protecting the active memory area;

means for locking down the mechanism that selects the active area before loading software to the staged area;

wherein the active storage area and staged storage area are being independently configured for lock down, and wherein the lock down is only removed by a special control signal applied to the storage area.

30. The apparatus of claim 29, further comprising:

means for loading and running an operating system; and means for saving a firmware image to the staged area.

31. The apparatus of claim 30, further comprising:

means for saving authentication information to the staged area.

32. A method of checking for updated Basic Input/Output memory;

running a BIOS Power On Self-Test from an active storage area of a firmware memory;

checking a staged storage area of the firmware memory for a BIOS image;

determining if the BIOS image stored in the staged storage area, if an image exists in the staged storage area, is newer than the image in the active storage area; and authenticating a new image in the staged storage area using a code in the active storage area; wherein the active storage area and staged storage area are being independently configured for lock down and wherein the lock down is only removed by a special control signal.

33. The method of claim 32, further comprising:

determining if the image stored in the staged storage area, if an image exists in the staged storage area, is authentic.

34. The method of claim 33, further comprising:

switching the active storage area.

35. The method of claim 34, further comprising:

generating a system reset.

* * * * *